United States Patent
Ishii

(10) Patent No.: US 7,426,284 B2
(45) Date of Patent: Sep. 16, 2008

(54) METHOD, APPARATUS, AND PROGRAM FOR IMAGE PROCESSING CAPABLE OF EFFECTIVELY PREVENTING AND DETECTING TAMPERING, AND A MEDIUM STORING THE PROGRAM

(75) Inventor: Masaki Ishii, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 654 days.

(21) Appl. No.: 11/144,718

(22) Filed: Jun. 6, 2005

(65) Prior Publication Data

US 2005/0276439 A1 Dec. 15, 2005

(30) Foreign Application Priority Data

Jun. 4, 2004 (JP) ............................. 2004-167114
Jul. 23, 2004 (JP) ............................. 2004-215114

(51) Int. Cl.
*G06K 9/00* (2006.01)
(52) U.S. Cl. ........................... 382/100; 382/175; 355/18
(58) Field of Classification Search ................. 382/100, 382/112, 113, 135, 136, 137, 138, 139, 140, 382/168, 171, 175, 178, 181, 188, 189, 190, 382/193, 201, 232, 239, 243, 254, 260, 274, 382/276, 286–293, 305, 318; 355/18, 23; 358/1.15; 707/205; 345/619; 399/371

See application file for complete search history.

(56) References Cited

U.S. PATENT DOCUMENTS 5,220,440 A * 6/1993 Hisatake ..................... 382/239
5,532,809 A * 7/1996 Hamanaka et al. .......... 399/371
6,043,823 A * 3/2000 Kodaira et al. .............. 345/619
6,529,918 B2 * 3/2003 Takahashi .................... 707/205
6,959,385 B2 * 10/2005 Murakami et al. .......... 713/176
7,023,574 B2 * 4/2006 Furuichi ..................... 358/1.15
7,312,845 B2 * 12/2007 Silverbrook ................. 355/18

FOREIGN PATENT DOCUMENTS

| JP | 5-191585 | 7/1993 |
| JP | 9-223225 | 8/1997 |
| JP | 2003-34093 | 2/2003 |

* cited by examiner

*Primary Examiner*—Seyed Azarian
(74) *Attorney, Agent, or Firm*—Dickstein Shapiro LLP

(57) ABSTRACT

An image processing apparatus includes an acquiring mechanism configured to acquire an original document image, a dividing mechanism configured to divide the original document image acquired by the acquiring mechanism into a plurality of areas arranged in symmetry with respect to a center point of the original document image when the original document image is rotated centering around the center point of the original document image, a generating mechanism configured to generate verification data corresponding to the plurality of respective areas divided by the dividing mechanism, and an embedding mechanism configured to embed the verification data to the original document image in an identical scanning direction in a manner of point symmetry with respect to the center point of the original document image and to generate an encoded document image including the verification data.

40 Claims, 19 Drawing Sheets

FIG. 3A

ORIGINAL DOCUMENT IMAGE (OD)

REPORT

MR. JAMES SMITH

H/W MANAGER

FOLLOWING ARE CODENAMES RELATED TO ABC.

BOARD 1

CONCERTO

BOARD 2

SYMPHONY

ENCODED DOCUMENT IMAGE (ED)

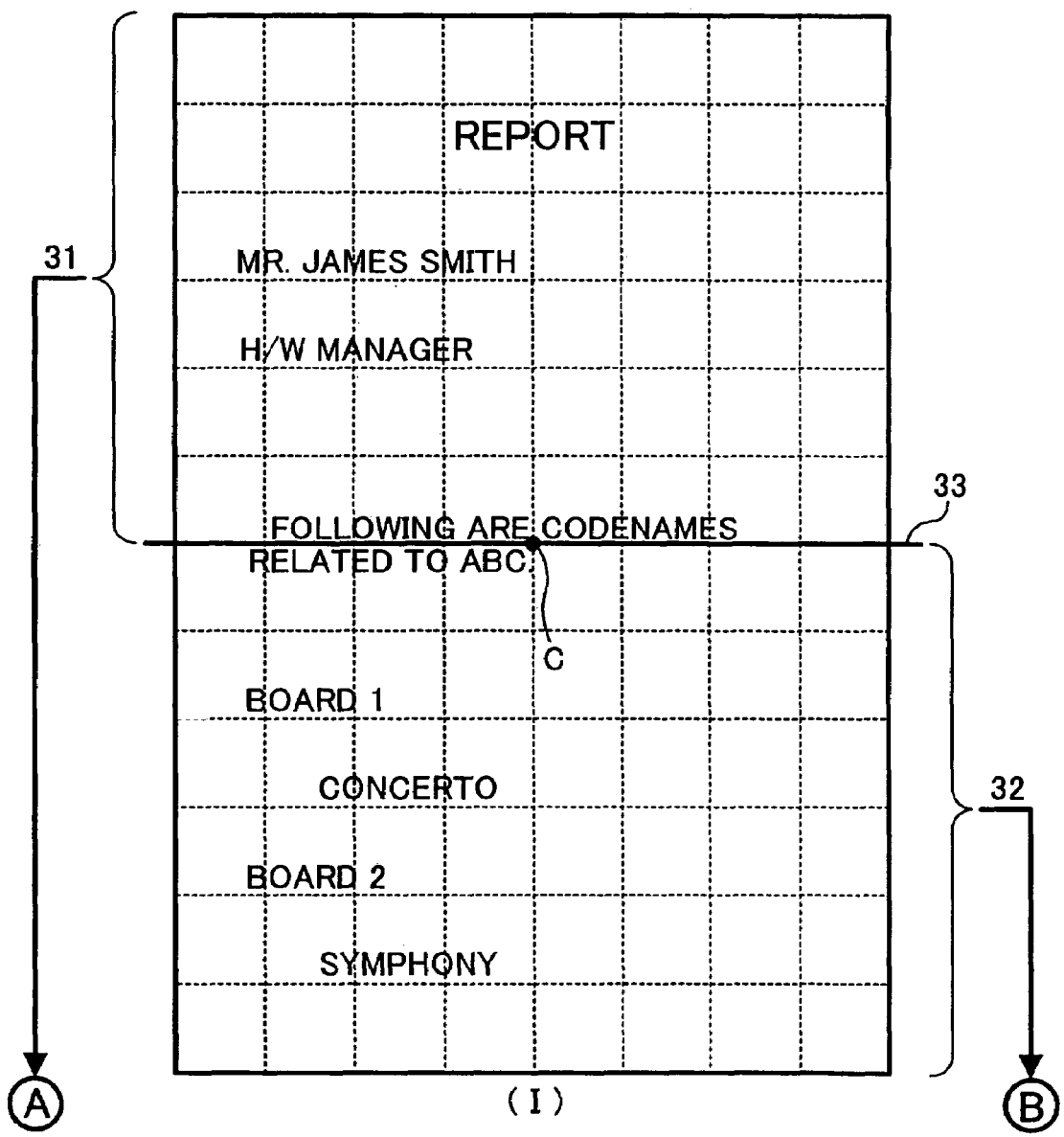

BIT 0

BIT 1

FIG. 9

ENCODED DOCUMENT IMAGE (ED)

REPORT

MR. JAMES SMITH

H/W MANAGER

FOLLOWING ARE CODENAMES
RELATED TO ABC.

BOARD 1

CONCERTO

BOARD 2

SYMPHONY

| FIG. 13A |
| FIG. 13B |
| FIG. 13C |

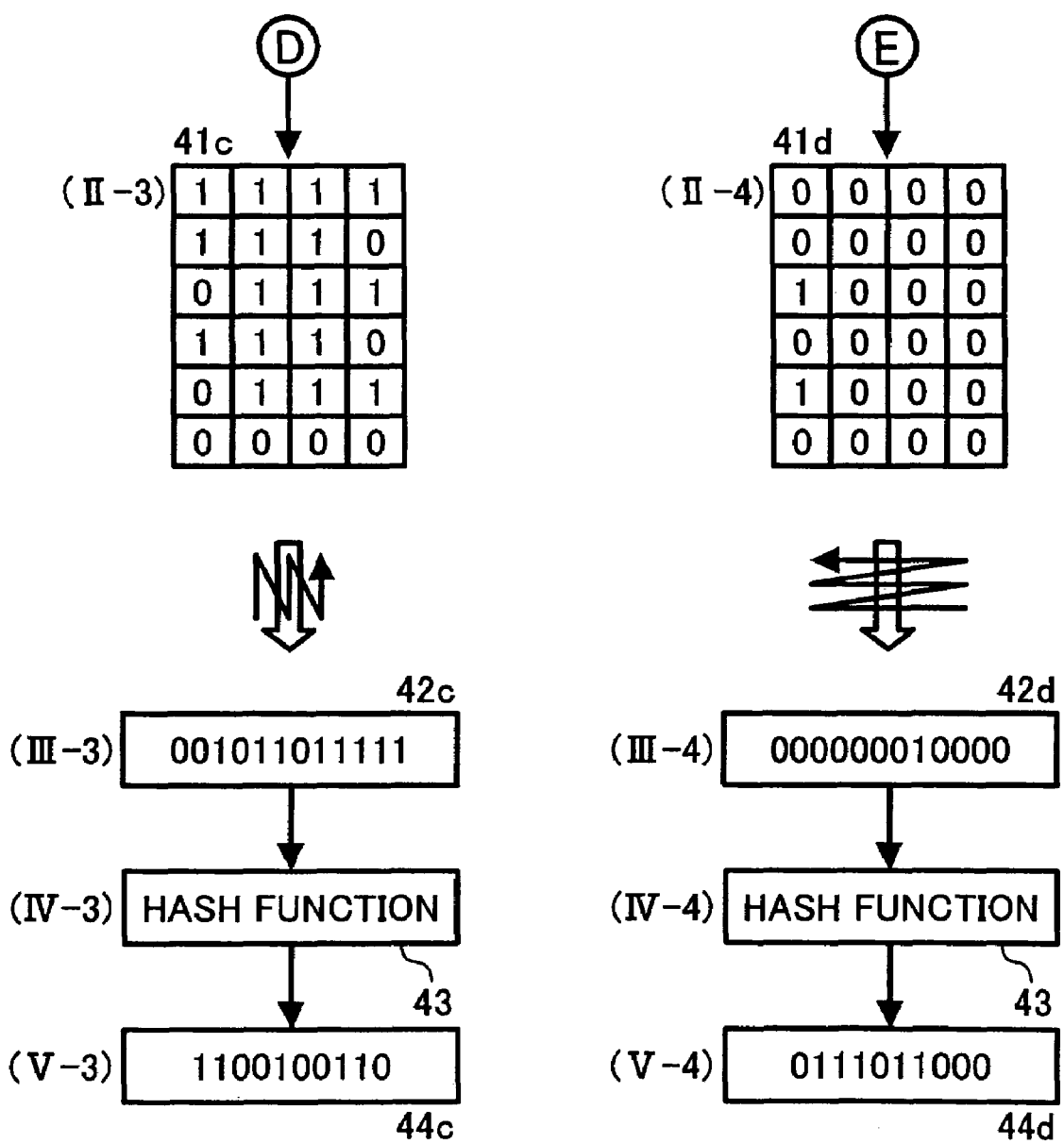

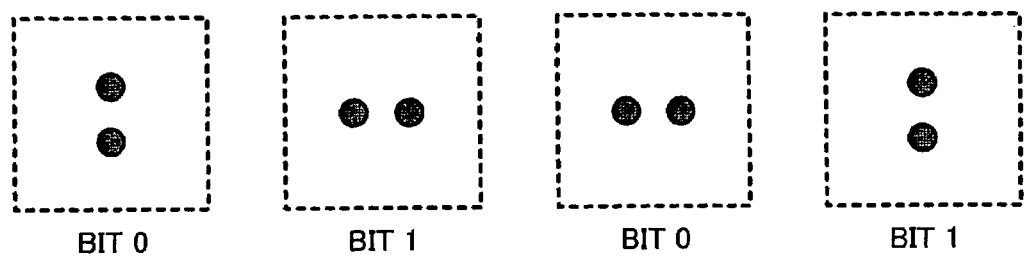
FIG. 14A  FIG. 14B  FIG. 14C  FIG. 14D
BIT 0   BIT 1   BIT 0   BIT 1
FIG. 15
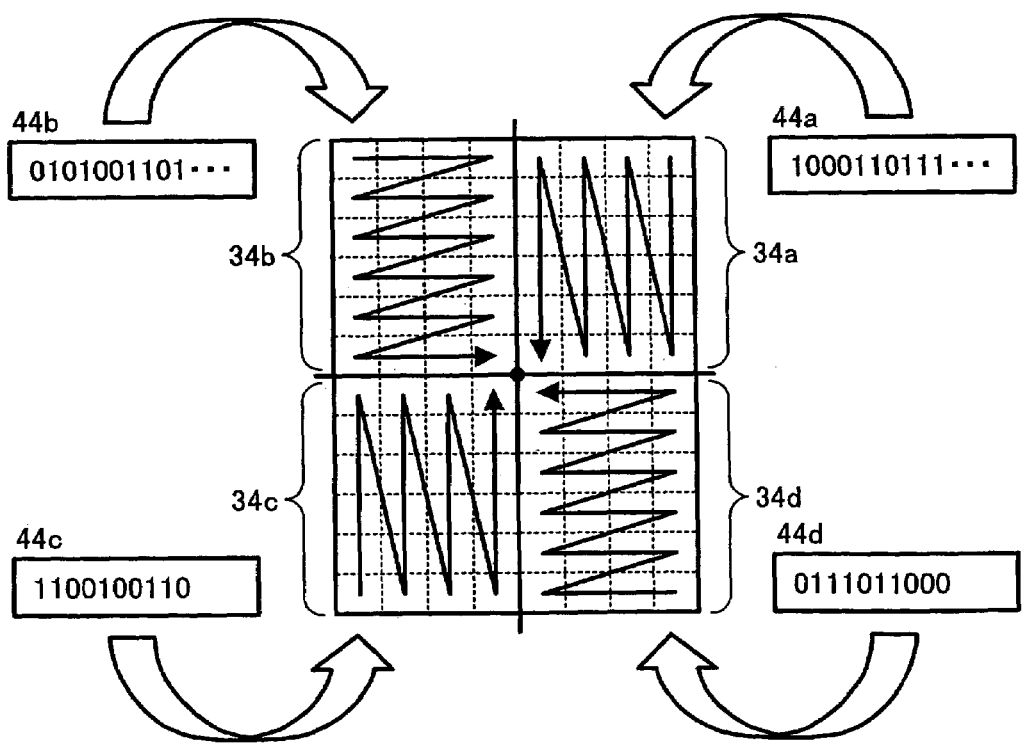

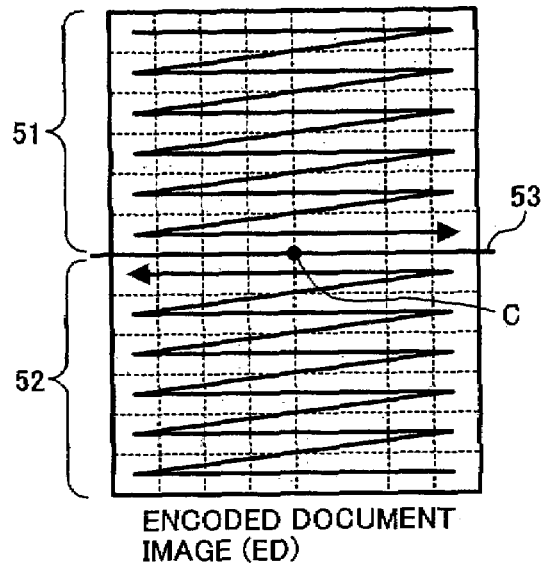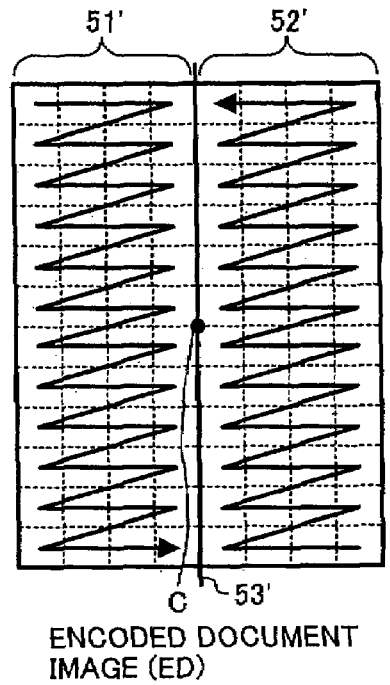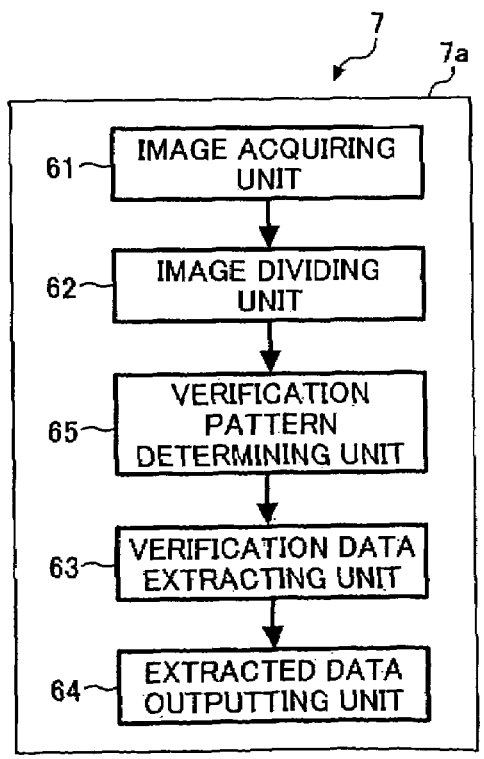

FIG. 23

ENCODED DOCUMENT IMAGE (ED)

| | REPORT | MR. JAMES SMITH | H/W MANAGER | FOLLOWING ARE CODENAMES RELATED TO ABC | BOARD 1 | CONCERTO | BOARD 2 | SYMPHONY | |

METHOD, APPARATUS, AND PROGRAM FOR IMAGE PROCESSING CAPABLE OF EFFECTIVELY PREVENTING AND DETECTING TAMPERING, AND A MEDIUM STORING THE PROGRAM

BACKGROUND

The present patent application claims priority under 35 U.S.C. § 119 to Japan patent applications No. 2004-167114 filed on Jun. 4, 2004, and No. 2004-215114 filed on Jul. 23, 2004 in the Japanese Patent Office, the entire contents of which are incorporated herein by reference.

FIELD OF THE INVENTION

The present invention relates to a technique of detecting fraudulent alteration of a digital image or a printed material, and more particularly to a method, apparatus, and program for image processing capable of preventing and detecting tampering of the digital image or the printed material without confirming its scanning direction.

DESCRIPTION OF THE RELATED ART

A printed material including images and texts may as well include tamper-proof information, which may be returned to as confidential information, used for detecting fraudulent alteration. Such printed material generally has an orientation for proper recognition, including vertical ends or top and bottom ends, and the confidential information therein typically have a direction same as those of images and texts in the printed material. Therefore, when images and texts in the printed material are read with the printed material is oriented upside down, confidential information may not be correctly detected. There are some techniques to eliminate the above-described problems.

In one technique, a background image processing is used to provide a printed material in which the contents can easily be confirmed from the top, bottom, right, and left directions in printing, book-binding printing and the like. More specifically, the multidirectional printed material including images such as symbols, characters, numbers, sentences, maps and the like is capable of reading from both the top and bottom ends by printing the same images symmetrically with respect to a median point to produce a normal print image and a reverse print image. The normal print image can be confirmed from the bottom end of the printed material, and the reverse print image can be confirmed from the top end of the printed material.

However, the confidential information may be embedded more than once to make it readable from different directions, which may result in reduction of amount of embeddable information.

In another technique, a background image processing is used to determine a direction of sentence information written on a sheet and to automatically rotate the sheet when the direction of sentence information is inversed. More specifically, the sentence information is read and divided into a plurality of areas, such as upper and lower areas or right and left areas. The numbers of lines of the respective areas are then compared with each other to determine the direction of the sentence information. In a case in which the sentence information is oriented to a different direction, the direction of the sentence information can automatically be rotated.

Another technique allows a background image processing to use a specific pattern to judge the vertical and horizontal directions of an image.

However, when the printed material is read to extract the confidential information with the above-described two techniques, determination of the sheet directions may take long, which may result in a long time process to extract the confidential information and in an increase of processing amount.

SUMMARY

Accordingly, the present invention solves many of the problems resulting from above-described circumstances.

The present invention provides an apparatus, method, and related computer program product or computer readable recording medium, capable of preventing and detecting tampering of a printed material without confirming its scanning direction, especially when such a material is placed with an orientation different from an original image of the material.

In one embodiment, a novel image processing apparatus includes an acquiring mechanism, a dividing mechanism, a generating mechanism, and an embedding mechanism. The acquiring mechanism is configured to acquire an original document image. The dividing mechanism is configured to divide the original document image acquired by the acquiring mechanism into a plurality of areas arranged in symmetry with respect to a center point of the original document image when the original document image is rotated centering around the center point of the original document image. The generating mechanism is configured to generate verification data corresponding to the plurality of respective areas divided by the dividing mechanism. The embedding mechanism is configured to embed the verification data to the original document image in an identical scanning direction in a manner of point symmetry with respect to the center point of the original document image and to generate an encoded document image including the verification data.

The novel image processing apparatus may further include a verification pattern determining mechanism configured to determine a plurality of verification patterns of the verification data to be rendered to the plurality of respective areas.

The verification data may be rendered with the plurality of verification patterns configured to form same patterns when the encoded document image is scanned in the identical scanning direction in a manner of point symmetry with respect to the center point of the original document image.

The novel image processing apparatus may further include a printing mechanism configured to print out the encoded document image.

The verification data may include tamper-proof data.

Further, in one embodiment, a novel method of image processing includes the steps of acquiring an original document image, dividing the original document image into a plurality of areas arranged in symmetry with respect to a center point of the original document image when the original document image is rotated centering around the center point of the original document image, generating verification data corresponding to the plurality of respective areas, embedding the verification data in the original document image in an identical scanning direction in a manner of point symmetry with respect to the center point of the original document image, and generating an encoded document image including the verification data.

The novel method may further include the step of determining a plurality of verification patterns of the verification data to be rendered to the plurality of respective areas.

The novel method may further include the step of printing out the encoded document image.

In another embodiment, a computer program product stored on a computer readable storage medium run on an image processing apparatus carries out an image processing method, as described above.

Further, in another embodiment, a computer readable medium storing computer instructions performs an image processing method, as described above.

In one embodiment, a novel image forming apparatus includes an acquiring mechanism, a dividing mechanism, and an extracting mechanism. The acquiring mechanism is configured to acquire an encoded document image. The dividing mechanism is configured to divide the encoded document image acquired by the acquiring mechanism into a plurality of areas arranged in symmetry with respect to a center point of the encoded document image when the original document image is rotated centering around the center point of the original document image. The extracting mechanism is configured to extract the verification data from the encoded document image in an identical scanning direction in a manner of point symmetry with respect to the center point of the encoded document image.

The novel image processing apparatus may further include a verification pattern determining mechanism configured to determine a plurality of verification patterns of the verification data to be rendered to the plurality of respective areas.

The acquiring mechanism may acquire the encoded document image as a printed material.

The novel image processing apparatus may further include an outputting mechanism configured to output at least one of extracted verification data extracted by the verification data extracting mechanism and an extraction result extracted by the verification data extracting mechanism.

The verification data may include tamper-proof data.

Further, in one embodiment, a novel method of image processing includes the steps of acquiring an encoded document image, dividing the encoded document image into a plurality of areas arranged in symmetry with respect to a center point of the encoded document image when the original document image is rotated centering around the center point of the original document image, and extracting the verification data from the encoded document image in an identical scanning direction in a manner of point symmetry with respect to the center point of the encoded document image.

The novel method may further include the step of determining a plurality of verification patterns of the verification data to be rendered to the plurality of respective areas.

The acquiring step may acquire the encoded document image as a printed material.

The novel method may further include the step of outputting at least one of extracted verification data and an extraction result extracted by the extracting.

In another embodiment, a computer program product stored on a computer readable storage medium run on an image processing apparatus carries out an image processing method, as described above.

Further, in another embodiment, a computer readable medium storing computer instructions performs an image processing method, as described above.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3A is an exemplary document image to be processed by the image processing apparatus shown in FIGS. 1 and 2;

FIGS. 5A and 5B show an exemplary process of acquiring data of the exemplary document image performed by the image processing apparatus of FIGS. 1 and 2;

FIG. 9 is the exemplary encoded document image of FIG. 3B, showing the exemplary dot patterns embedded thereto;

FIGS. 13A, 13B and 13C show an exemplary process of acquiring data of the exemplary document image performed by the image processing apparatus of FIGS. 1 and 2;

FIGS. 14A, 14B, 14C, and 14D show exemplary dot patterns of verification data to be embedded to the exemplary document image of FIG. 12;

FIG. 15 shows exemplary scanning directions for embedding verification data to respective areas shown in FIG. 12;

FIG. 18 is an exemplary document image divided into two areas and exemplary scanning directions for extracting verification data from the two areas;

FIG. 19 is another exemplary scanning direction for extracting verification data to two areas divided differently from FIG. 18;

FIG. 20 is a block diagram illustrating an image processing apparatus alternative to the block diagram shown in FIG. 16;

FIG. 23 is the exemplary encoded document of FIG. 22 rotated to a different orientation.

DETAILED DESCRIPTION

Figure 1:
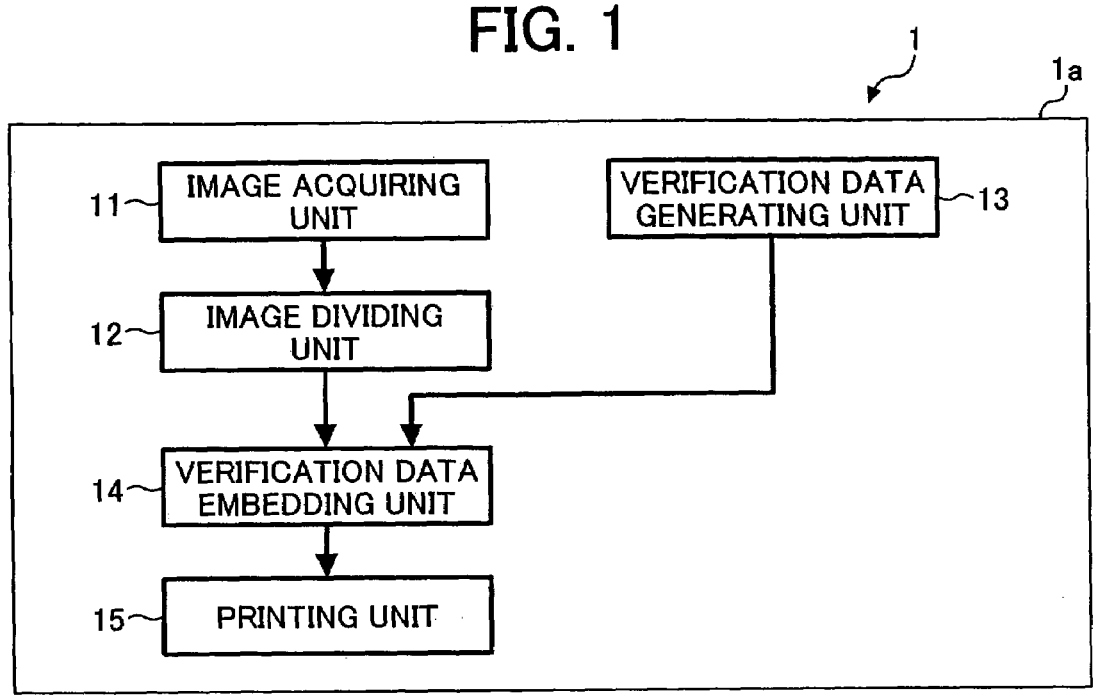
FIG. 1 is a block diagram illustrating an image processing apparatus according to an exemplary embodiment of the present invention.

In describing embodiments of the present invention illustrated in the drawings, specific terminology is employed for clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, preferred embodiments of the present invention are described.

Figure 2:
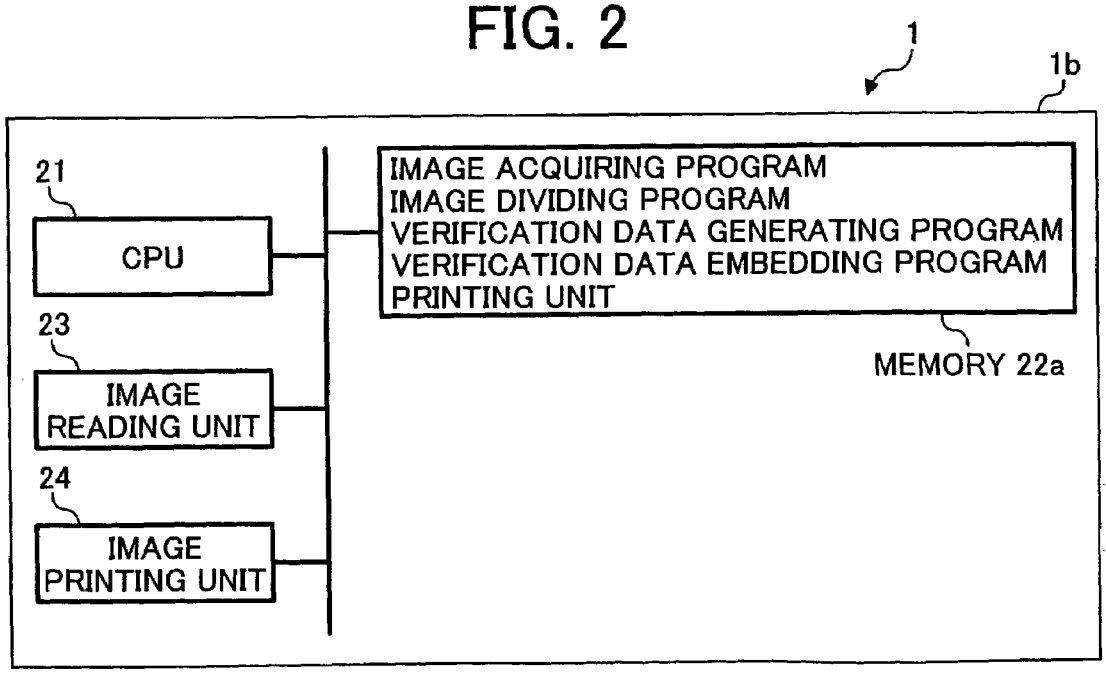
FIG. 2 is a structure of an image processing apparatus corresponding to the image processing apparatus shown in FIG. 1.

Referring to FIGS. 1 and 2, a verification data embedding device 1 according to an exemplary embodiment of the present invention is described.

FIG. 1 shows a functional block diagram 1a of the verification data embedding device 1 that serves as an image processing apparatus performing tampering detection. In FIG. 1, the verification data embedding device 1 produces a printed material to which verification data is embedded so that fraudulent alteration can be detected even when the printed material is read from an opposite side where the original document image is originally scanned. That is, when the printed material is placed upside down and scanned, verification data embedded to the original document can be detected without confirming the orientation of the printed material.

The verification data embedding device 1 includes an original document image acquiring unit 11, an original document image dividing unit 12, a verification data generating unit 13, a verification data embedding unit 14, and a printing unit 15.

The original document image acquiring unit 11 acquires an original document image.

The original document image dividing unit 12 divides the original document image into a plurality of areas by a parting line across a center of the original document image.

The verification data generating unit 13 generates respective verification data corresponding to the plurality of respective areas.

The verification data embedding unit 14 embeds verification patterns of the verification data to the plurality of respective areas of the original document image to overlap the verification patterns to the original document image to generate an encoded document image.

The printing unit 15 prints the encoded document image.

FIG. 2 shows a schematic structure 1b of the verification data embedding device 1 corresponding to the functional block diagram 1a of FIG. 1.

In the schematic structure 1b of the verification data embedding device 1, there are a central processing unit (CPU) 21, a memory 22a, an image reading unit 23, and a printing unit 24.

The memory 22a includes a read only memory (or a ROM), a random access memory (or a RAM), etc., and stores an original document image acquiring program, an original document image dividing program, a verification data generating program, a verification data embedding program, and a printing program so that these programs can perform respective steps of verification data embedding according to the present invention.

Processes for embedding verification data by the verification data embedding device 1 are described below, referring to FIGS. 3A, 3B, 3C, and 4.

Figure 3B:
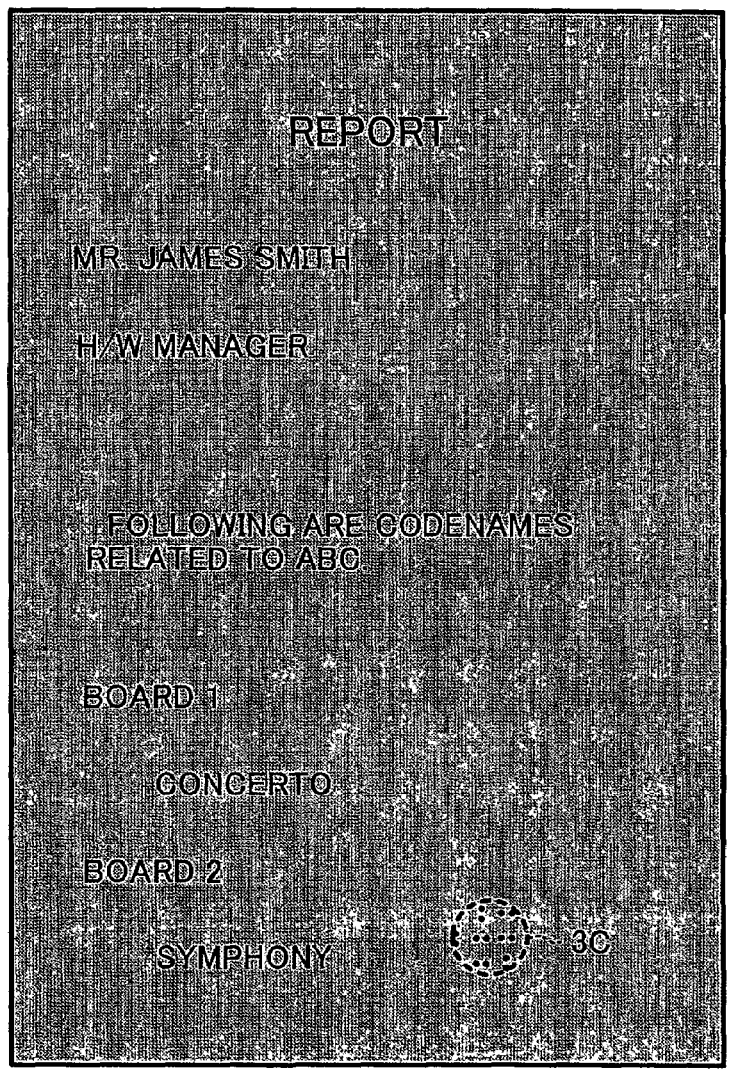
FIG. 3B is an exemplary encoded document image generated by the image processing apparatus shown in FIGS. 1 and 2.
Figure 3C:
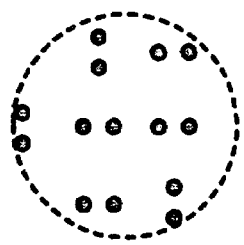
FIG. 3C is an enlarged part of the exemplary encoded document image of FIG. 3B.
Figure 4:
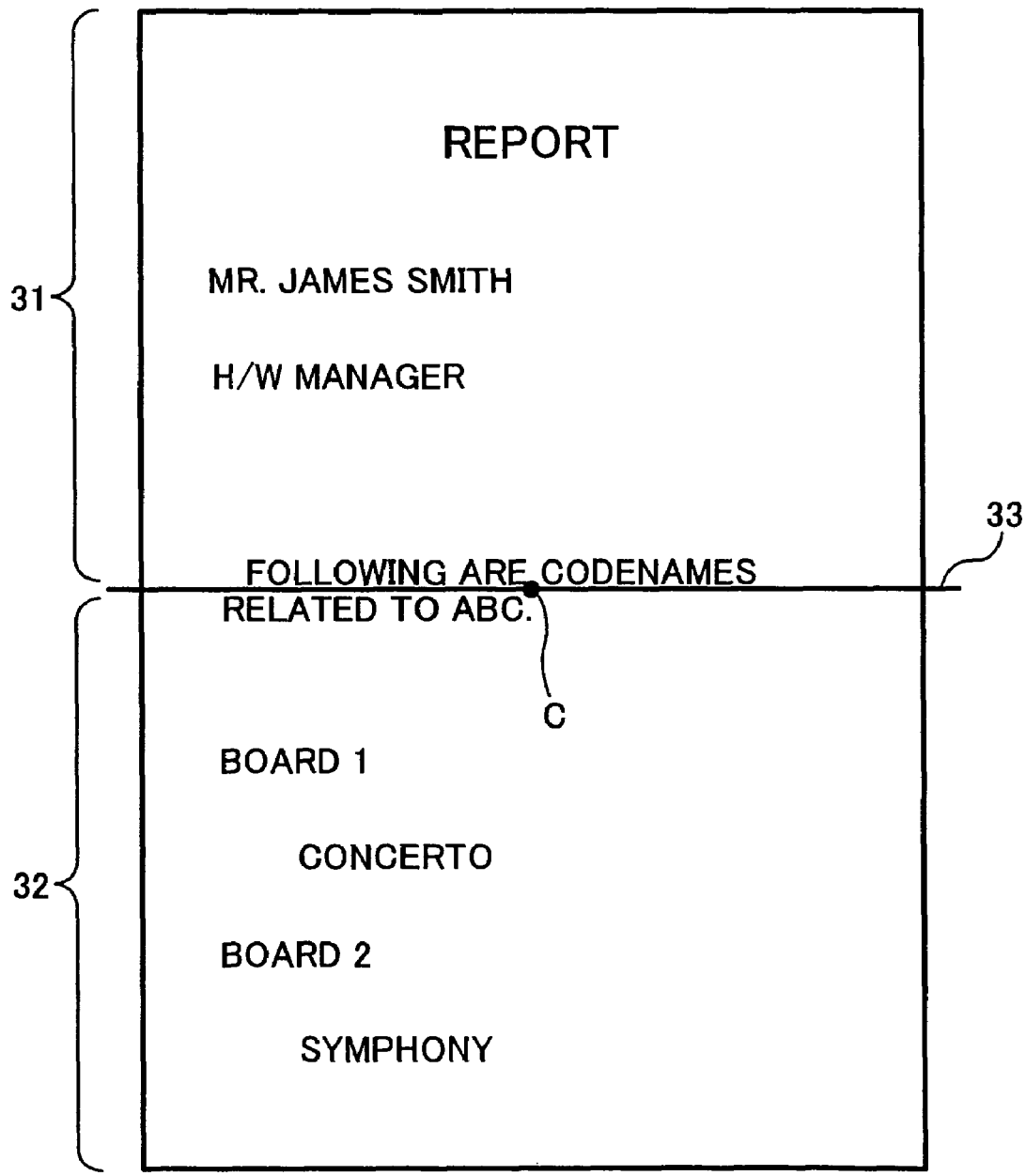
FIG. 4 is the exemplary document image divided into two areas.

FIG. 3A shows a document image before verification data is embedded, which is referred to as an original document image OD. FIG. 3B shows another document image after verification data is embedded, which is referred to as an encoded document image ED. FIG. 3C shows an enlarged portion of the encoded document image ED of FIG. 3B. FIG. 4 identifies a parting line laterally dividing the original document image OD into two equal areas.

First, the original document image acquiring unit 11 acquires the original document image OD as shown in FIG. 3A. The original document image dividing unit 12 divides the original document image OD into upper and lower areas 31, 32 by a parting line (or a horizontal line) 33 horizontally extending across a center point C of the original document image OD, as shown in FIG. 4. That is, the original document image OD is laterally divided into two equal areas.

In this embodiment, the original document image OD is divided into two equal areas. However, an original document image may be divided into a plurality of equal areas other than two equal areas.

The verification data generating unit 13 generates verification data corresponding to the upper and lower areas 31 and 32.

Figure 5B:
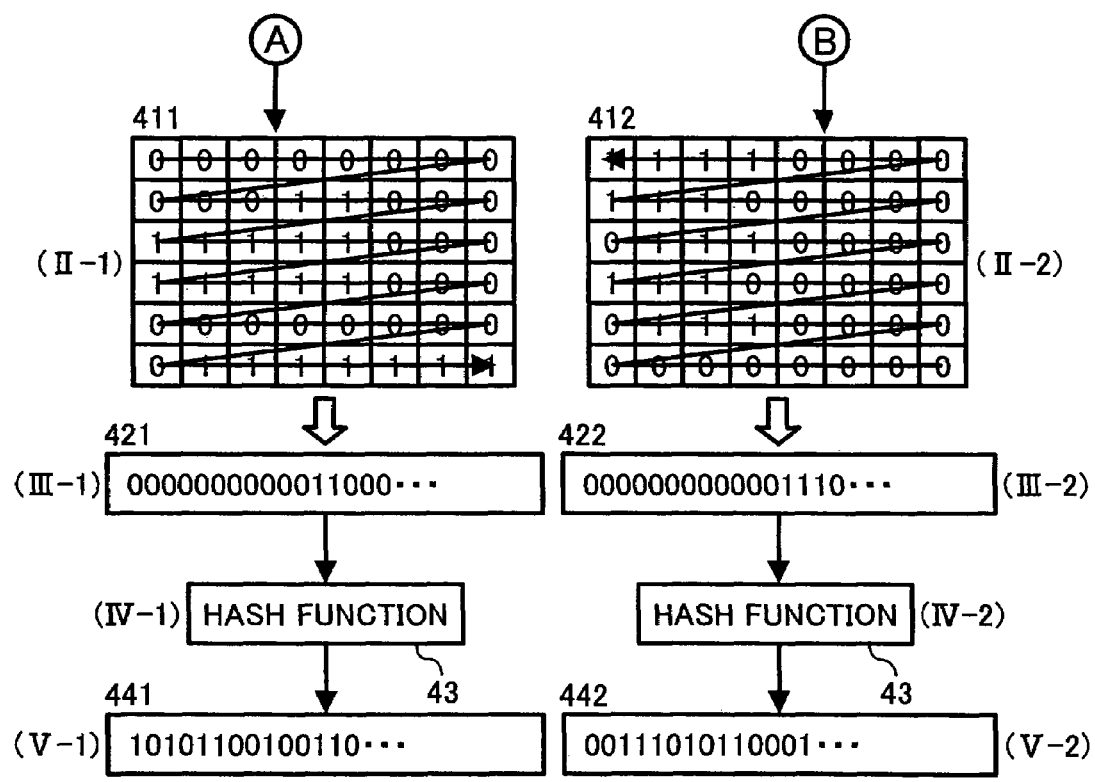

Referring to FIGS. 5A and 5B, examples of processes of generating respective verification data corresponding to the upper and lower areas 31 and 32 are now described.

(I) of FIG. 5A, and (II-1), (III-1), (IV-1), and (V-1) of FIG. 5B show example processes of generating verification data corresponding to the upper area 31.

The upper area 31 is further divided into a plurality of rectangle areas as shown in (I) of FIG. 5A. The verification data generating unit 13 assigns a code "1" to an area having a stroke of a character and a code "0" to an area having no stroke of a character, which forms a code matrix 411 as shown in (II-1) of FIG. 5B. The verification data generating unit 13 then performs raster scanning over the plurality of rectangle areas in the code matrix 411, starting from the upper left area to the lower right area, to obtain a code string 421 including "0" and "1" as shown in (III-1) of FIG. 5B. The code string 421 is calculated with a hash function 43 as shown in (IV-1) of FIG. 5B, so that first verification data 441 may be generated as shown in (V-1) of FIG. 5B.

(I) of FIG. 5A, and (II-2), (III-2), (IV-2), and (V-2) of FIG. 5B show example processes of generating verification data corresponding to the lower area 32. The processes of generating verification data corresponding to the lower area 32 are basically similar to the above-described processes corresponding to the upper area 31, except for the direction of scanning.

The lower area 32 is further divided into a plurality of rectangle areas as shown in (I) of FIG. 5A. The verification data generating unit 13 assigns a code "1" to an area having a stroke of a character and a code "0" to an area having no stroke of a character, which forms a code matrix 412 as shown in (II-2) of FIG. 5B. The verification data generating unit 13 then performs raster scanning over the plurality of rectangle areas in the code matrix 412, starting from the lower right area to the upper left area, to obtain a code string 422 including "0" and "1" as shown in (III-2) of FIG. 5B. The code string 422 is calculated with a hash function 43 as shown in (IV-2) of FIG. 5B, so that second verification data 442 may be generated as shown in (V-1) of FIG. 5B.

Raster scanning is performed to read the upper and lower areas 31 and 32 symmetrically with respect to the center point C, so that the encoded document image ED may be scanned in the same way as the original document image OD even when the encoded document image ED is placed with a different orientation from the original document image OD.

Figure 6A:
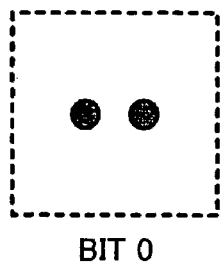
FIGS. 6A and 6B show exemplary dot patterns of verification data to be embedded to the exemplary document image of FIG. 3A.
Figure 6B:
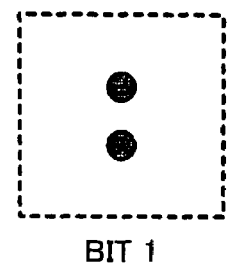

FIGS. 6A and 6B show dot patterns used for embedding the verification data generated by the verification data generating unit 13. A bit 0 pattern of FIG. 6A and a bit 1 pattern of FIG. 6B are configured to remain in the same shapes when the printed material is scanned from an opposite side to the original document image OD.

The verification data embedding unit 14 embeds verification data generated by the verification data generating unit 13 to respective single rectangle areas of the original document image OD. That is, the verification data embedding unit 14 embeds the first and second verification data 441 and 442 to the upper and lower areas 31 and 32, respectively, to form an encoded document image ED as shown in FIG. 3B.

This embodiment uses two types of dot patterns as shown in FIGS. 6A and 6B. The verification image pattern embedding unit 14 embeds these two types of dot patterns according to verification data into respective single rectangle areas that reside in the upper and lower areas 31 and 32.

Figure 7:
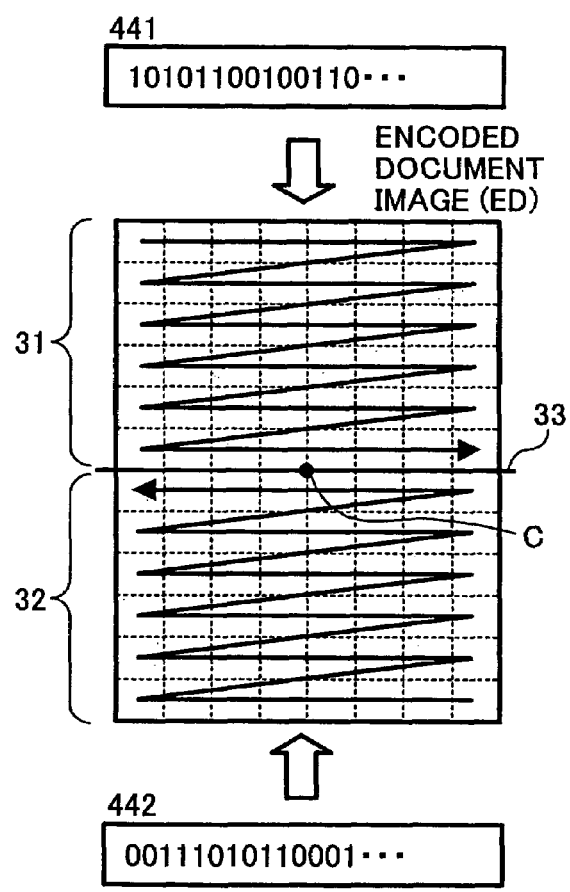
FIG. 7 shows exemplary scanning directions for embedding verification data to respective areas shown in FIG. 4.

FIG. 7 shows how the verification data is scanned and embedded. In FIG. 7, the dot patterns corresponding to the first verification data 441 are embedded to the upper area 31 in a direction as shown in FIG. 7, and the dot patterns corresponding to the second verification data 442 are embedded to the lower area 32 in a direction that is different from the direction for the first verification data 441. With the above-described operations, even when the same document image placed with a direction differently oriented is scanned, the verification data can correctly be extracted. The detail of extraction of verification data will be described later.

Figure 8:
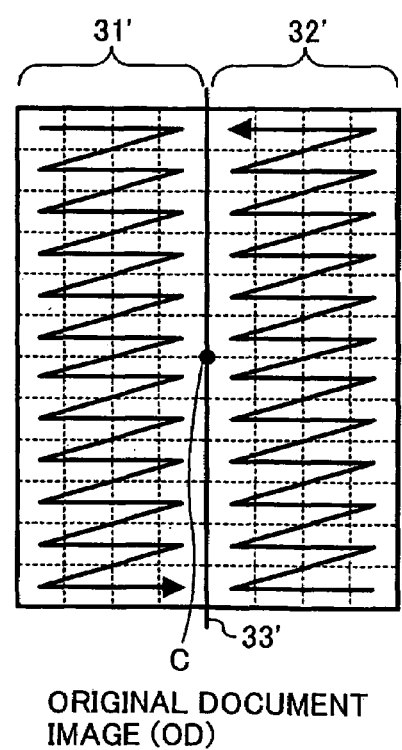
FIG. 8 is another exemplary scanning direction for embedding verification data to two areas divided differently from FIG. 7.

FIG. 8 shows another example of what the original document image dividing unit 12 can do. The original document image OD may be not only horizontally divided but also vertically divided as shown in FIG. 8. In FIG. 8, the original document image OD is divided into left and right areas 31' and 32' by a parting line (or a vertical line) 33' vertically extending across the center point C of the original document image OD.

FIG. 9 shows the encoded document image ED with the dot patterns overlapped or embedded. The encoded document image ED includes two types of the dot patterns as the verification data.

The printing unit 15 of FIG. 1 may print the encoded document image ED generated by the verification pattern embedding unit 14.

With the above-described operations, a printed material that includes extractable verification data may be produced even when the encoded document image ED is scanned with a direction differently oriented. That is, the verification data embedding device of the present invention can produce a printed material in which an image thereof has no change in appearance of verification patterns and in scanning direction for extracting the verification data even when the image of the printed material is inverted or reversed.

Figure 10:
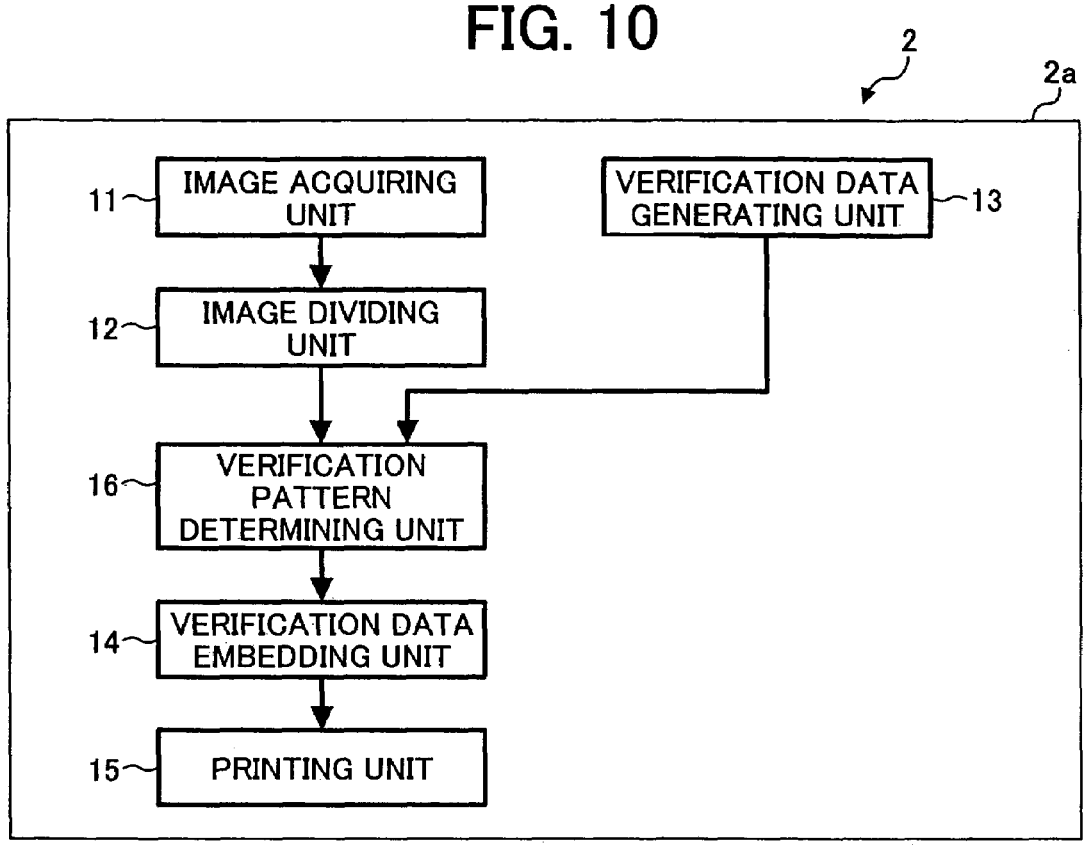
FIG. 10 is a block diagram illustrating an image processing apparatus alternative to the block diagram shown in FIG. 1.
Figure 11:
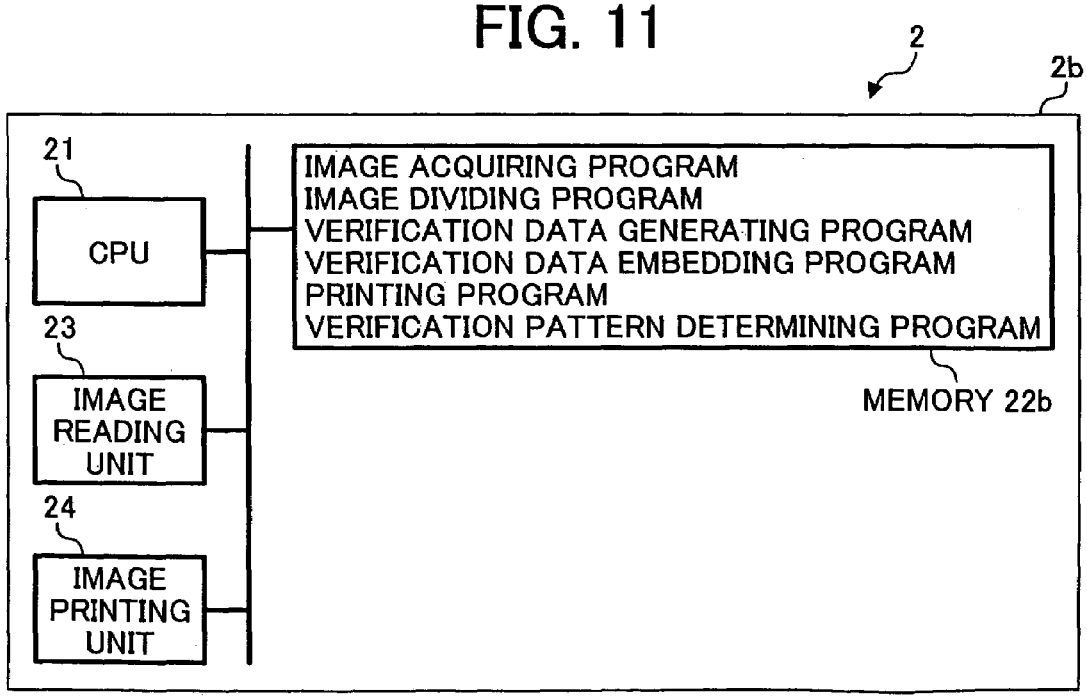
FIG. 11 is a structure of an image processing apparatus corresponding to the image processing apparatus shown in FIG. 10.

Referring to FIGS. 10 and 11, a verification data embedding device 2 alternative to the verification data embedding device 1 according to another embodiment of the present invention is now described.

FIG. 10 shows a functional block diagram 2a of the verification data embedding device 2 that serves as an image processing apparatus performing tampering detection. In FIG. 10, the verification data embedding device 2 produces a printed material to which verification data is embedded so that fraudulent alteration can be detected even when the printed material is scanned with a different orientation the original document image. The verification data embedding device 2 of FIG. 10 is basically similar to the verification data embedding device 1, except that the verification data embedding device 2 further includes a verification pattern determining unit 16.

The verification pattern determining unit 16 determines verification patterns to be embedded to the original document image OD.

FIG. 11 shows a schematic structure 2b of the verification data embedding device 2 corresponding to the functional block diagram 2a of FIG. 10.

The schematic structure 2b of the verification data embedding device 2 is basically same as the schematic structure 1b of the verification data embedding device 1 of FIG. 2, except that a verification pattern determining program is additionally stored in a memory 22b. The verification pattern determining program may be run on the verification pattern determining unit 16.

Referring to FIGS. 12, 13A, 13B, and 13C, processes for embedding verification data by the verification data embedding device 2 are described.

Figure 12:
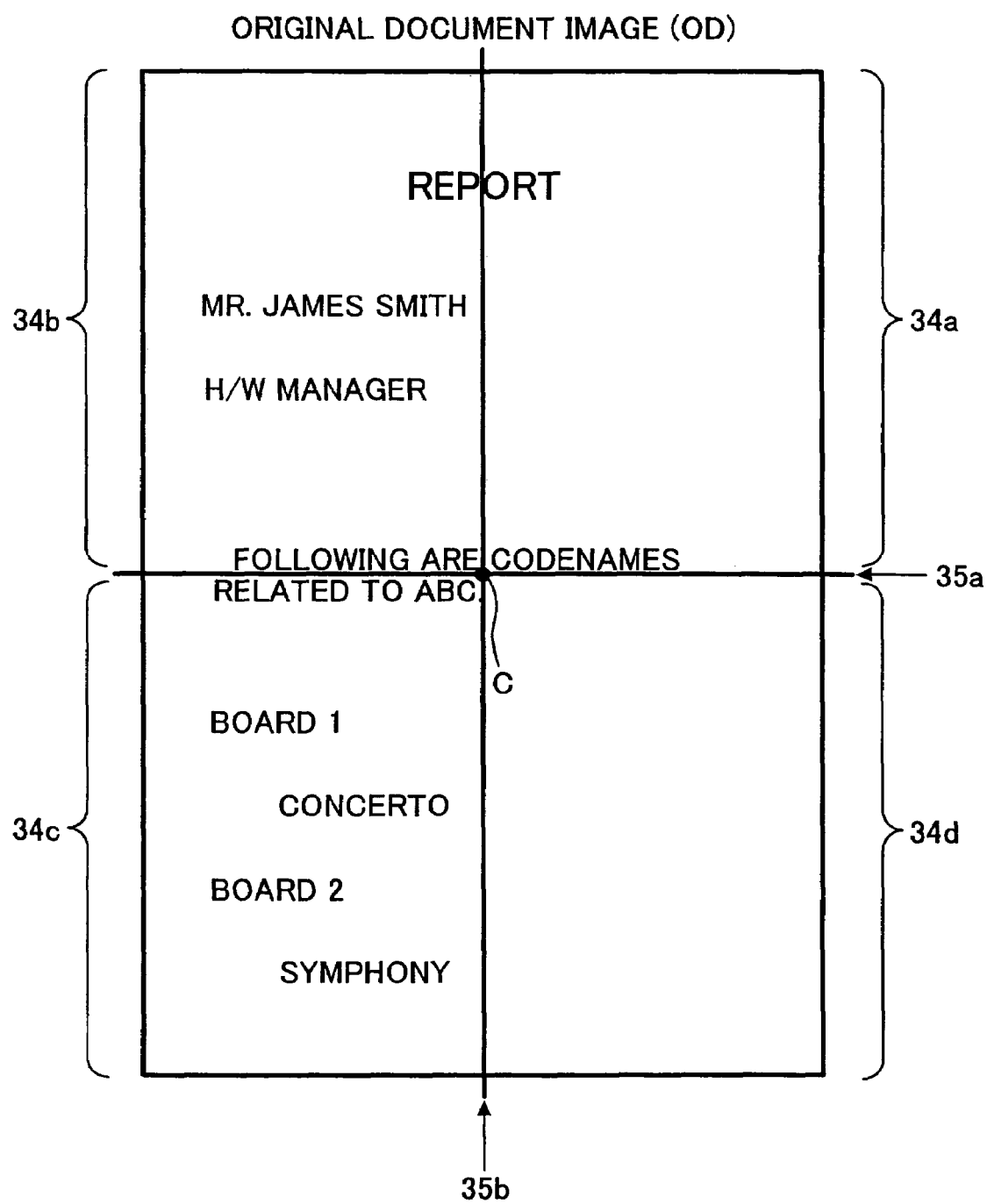
FIG. 12 is an exemplary document image divided into four areas.

The processes for embedding verification data by the verification data embedding device 2 are basically the same as those of the verification data embedding device 1 shown in FIGS. 3A, 3B, and 3C, except that the original document image is divided into four equal areas. In this example, the original document image dividing unit 12 divides the original document image into four equal areas. More specifically, as shown in FIG. 12, the original document image dividing unit 12 divides the original document image OD into upper right, upper left, lower left, and lower right areas 34a, 34b, 34c, and 34d by parting lines (or horizontal and vertical lines) 35a and 35b horizontally and vertically extending across a center point C of the original document image OD. That is, the original document image OD is laterally and longitudinally divided into four equal areas.

In this example, the original document image OD of FIG. 12 is divided into four equal areas. However, an original document image may be divided into a plurality of equal areas other than four equal areas.

The verification data generating unit 13 generates verification data corresponding to the upper right, upper left, lower left, and lower right areas 34a, 34b, 34c, and 34d.

Figures 13, 13A:
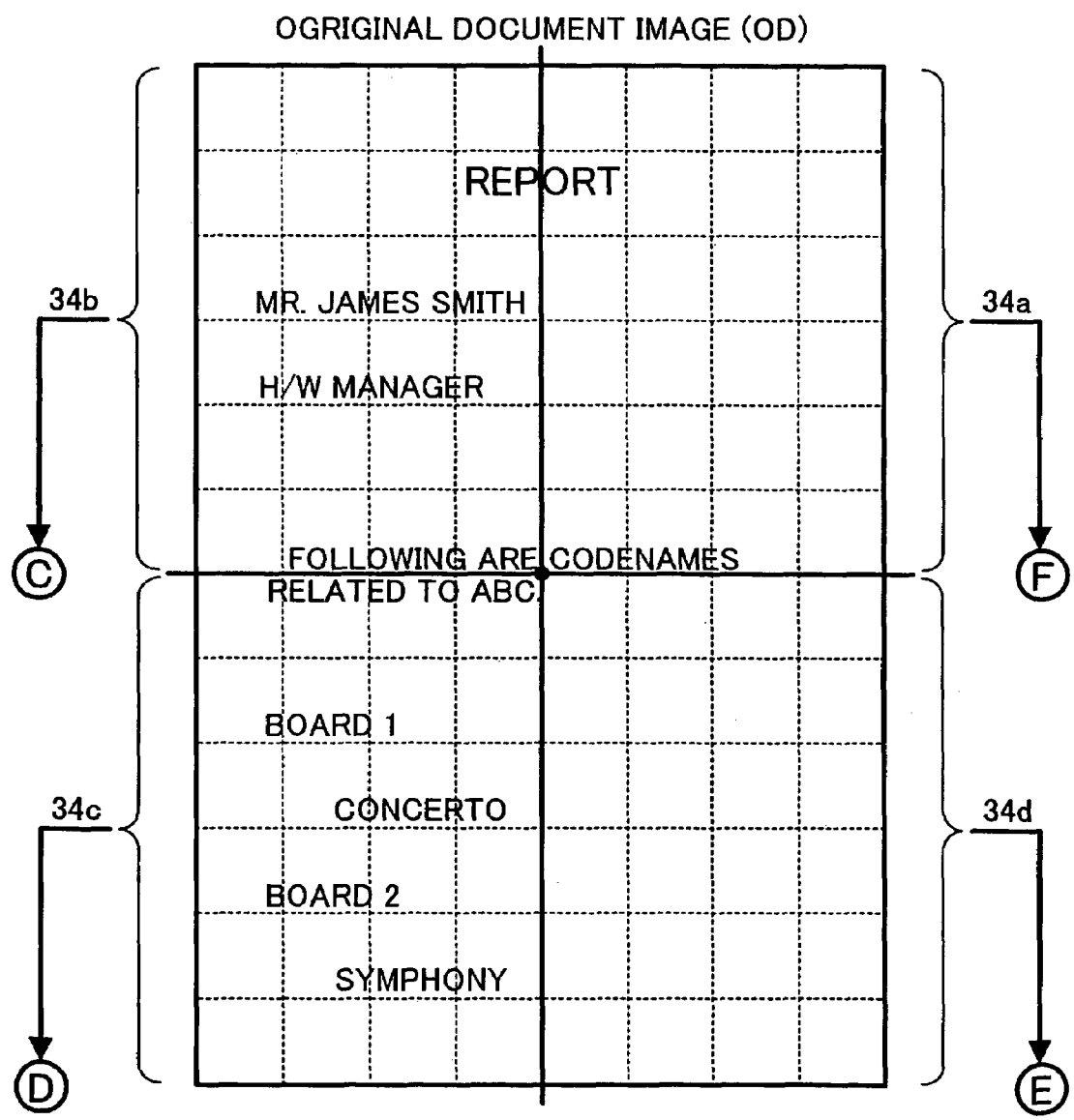
Figure 13B:
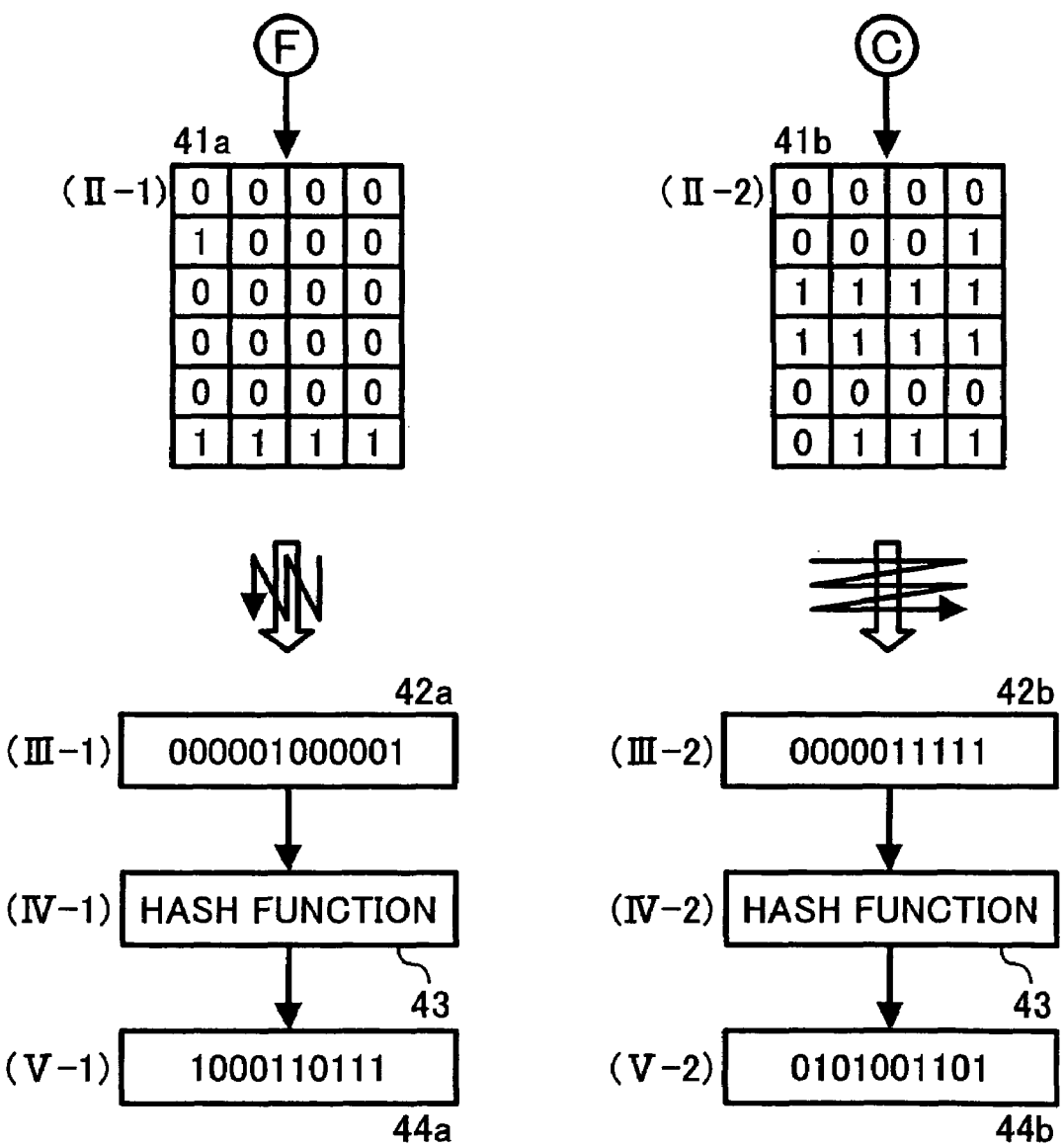

FIGS. 13A, 13B, and 13C show examples of processes of generating verification data corresponding to the upper right, upper left, lower left, and lower right areas 34a, 34b, 34c, and 34d.

(I) of FIG. 13A, and (II-1), (III-1), (IV-1), and (V-1) of FIG. 13B show example processes of generating verification data corresponding to the upper right area 34a.

The upper right area 34a is further divided into a plurality of rectangle areas as shown in (I) of FIG. 13A. The verification data generating unit 13 assigns a code "1" to an area having a stroke of a character and a code "0" to an area having no stroke of a character, which forms a code matrix 41a as shown in (II-1) of FIG. 13B. The verification data generating unit 13 then performs raster scanning over the plurality of rectangle areas horizontally from the upper right side to the lower left side in the code matrix 41a to obtain a code string 42a including "0" and "1" as shown in (III-1) of FIG. 13B. The code string 42a is calculated with a hash function 43 as shown in (IV-1) of FIG. 13B, so that first verification data 44a may be generated as shown in (V-1) of FIG. 13B.

(I) of FIG. 13A, and (II-2), (III-2), (IV-2), and (V-2) of FIG. 13B show example processes of generating verification data corresponding to the upper left area 34b. The processes of generating verification data corresponding to the upper left area 34b are basically same as the above-described processes corresponding to the upper right area 34a, except for the direction of scanning.

Namely, the upper left area 34b is further divided into a plurality of rectangle areas as shown in (I) of FIG. 13A. The verification data generating unit 13 assigns a code "1" to an area having a stroke of a character and a code "0" to an area having no stroke of a character, which forms a code matrix 41b as shown in (II-2) of FIG. 13B. The verification data generating unit 13 then performs raster scanning over the plurality of rectangle areas horizontally from the upper left side to the lower right side in the code matrix 41b to obtain a code string 42b including "0" and "1" as shown in (III-2) of FIG. 13B. The code string 42b is calculated with a hash function 43 as shown in (IV-2) of FIG. 13B so that second verification data 44b may be generated as shown in (V-2) of FIG. 13B.

(I) of FIG. 13A, and (II-3), (III-3), (IV-3), and (V-3) of FIG. 13C show example processes of generating verification data corresponding to the lower left area 34c. The processes of generating verification data corresponding to the lower left area 34c are basically same as the above-described processes corresponding to the upper right area 34a, except for the direction of scanning.

Namely, the lower left area 34c is further divided into a plurality of rectangle areas as shown in (I) of FIG. 13A. The verification data generating unit 13 assigns a code "1" to a region having a stroke of a character and a code "0" to a region having no stroke of a character, which forms a code matrix 41c as shown in (II-3) of FIG. 13C. The verification data generating unit 13 then performs raster scanning over the plurality of rectangle areas vertically from the lower left side to the upper right side in the code matrix 41c to obtain a code string 42c including "0" and "1" as shown in (III-3) of FIG. 13C. The code string 42c is calculated with a hash function 43 as shown in (IV-3) of FIG. 13C so that third verification data 44c may be generated as shown in (V-3) of FIG. 13C.

(I) of FIG. 13A, and (II-4), (III-4), (IV-4), and (V-4) of FIG. 13C show example processes of generating verification data corresponding to the lower right area 34d. The processes of generating verification data corresponding to the lower right area 34d are basically same as the above-described processes corresponding to the upper right area 34a, except for the direction of scanning.

The lower right area 34d is further divided into a plurality of rectangle areas as shown in (I) of FIG. 13A. The verification data generating unit 13 assigns a code "1" to an area having a stroke of a character and a code "0" to an area having no stroke of a character, which forms a code matrix 41d as shown in (II-4) of FIG. 13C. The verification data generating unit 13 then performs raster scanning over the plurality of rectangle areas vertically from the lower right side to the upper left side in the code matrix 41d to obtain a code string 42d including "0" and "1" as shown in (III-4) of FIG. 13C. The code string 42d is calculated with a hash function 43 as shown in (IV-4) of FIG. 13C so that fourth verification data 44d may be generated as shown in (V-4) of FIG. 13C.

Raster scanning is performed to read the upper right, upper left, lower left, and lower right areas 34a, 34b, 34c, and 34d of the original document image OD symmetrically with respect to the center point C, so that the encoded document image ED may be scanned in the same way as the original document image OD even when the encoded document image ED is scanned in a different orientation from the original document image OD.

The verification pattern determining unit 16 determines verification patterns identifying bit "0" and bit "1" so that verification data generated by the verification data generating unit 13 may be embedded in a form of the verification patterns to the upper right, upper left, lower left, and lower right areas 34a, 34b, 34c, and 34d.

FIGS. 14A, 14B, 14C, and 14D show examples of the verification patterns identifying bit 0s (zeros) and bit 1s (ones) to be embedded to the original document image OD.

FIGS. 14A and 14B are verification patterns identifying bit 0 and bit 1 to be embedded to the upper right and lower right area 34a and 34d, and FIGS. 14C and 14D are verification patterns identifying bit 0 and bit 1 to be embedded to the upper left and lower left area 34b and 34c.

In this embodiment, bit patterns are determined by the verification pattern determining unit 16. However, bit patterns may be previously determined without the control of the verification pattern determining unit 16. Further, the verification data embedding device 1 of FIGS. 1 and 2 may include the verification pattern determining unit 16.

FIG. 15 shows how the verification data embedding unit 14 embeds verification data.

The verification data embedding unit 14 embeds verification data generated by the verification data generating unit 13 to the original document image OD. That is, the verification data embedding unit 14 embeds the first, second, third, and fourth verification data 44a, 44b, 44c, and 44d to the upper right, upper left, lower left, and lower right areas 34a, 34b, 34c, and 34d, respectively.

FIG. 15 also shows respective scanning directions of verification data embedding when the first, second, third, and fourth verification data 44a, 44b, 44c, and 44d are embedded to the upper right, upper left, lower left, and lower right areas 34a, 34b, 34c, and 34d, respectively.

With the above-described operations for embedding verification data, even when a document image horizontally or vertically inverted is scanned, the verification data can correctly be extracted.

As previously described, the verification data embedding device 2 of FIG. 10 includes the printing unit 15 for printing the encoded document image ED.

With the above-described operations, a printed material having extractable verification data may be produced without determining whether the encoded document image ED is scanned from the same or the different side of the original document image OD.

With the above-described verification data embedding device of the present invention, the verification data can be rendered in various verification patterns that can be rendered in a same form as the verification patterns are originally scanned even when the printed material is inverted horizontally or vertically. Therefore, the verification data embedding device of the present invention can produce a printed material in which an image thereof has no change in appearance of verification patterns and in scanning direction for extracting the verification data even when the image of the printed material is inverted or reversed.

Referring to FIGS. 16 through 19, a verification data extracting device (or a tampering detection data extracting unit) 6 according to another exemplary embodiment of the present invention is described. This embodiment shows a case in which tampered information is included in confidential information embedded to a printed material.

Figure 16:
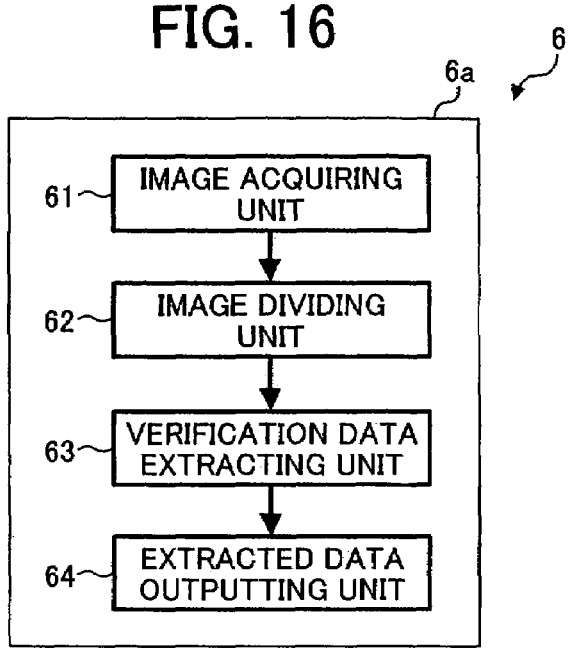
FIG. 16 is a block diagram illustrating an image processing apparatus according to another exemplary embodiment of the present invention.

FIG. 16 shows a functional block diagram 6a of the verification data extracting unit 6 that serves as an image processing apparatus performing tampering detection. In FIG. 16, the verification data extracting device 6 extracts verification data to detect fraudulent alteration.

The verification data extracting unit 6 includes an encoded document image acquiring unit 61, an encoded document image dividing unit 62, a verification data extracting unit 63, and an extracted data outputting unit 64.

The encoded document image acquiring unit 61 acquires an encoded document image ED.

The encoded document image dividing unit 62 divides the encoded document image ED into a plurality of areas by a parting line across the center of the encoded document image ED.

The verification data extracting unit 63 extracts the verification data by performing raster scanning.

The extracted data outputting unit 64 outputs the result of the above-described extraction of verification data to an output unit such as a display screen.

Figure 17:
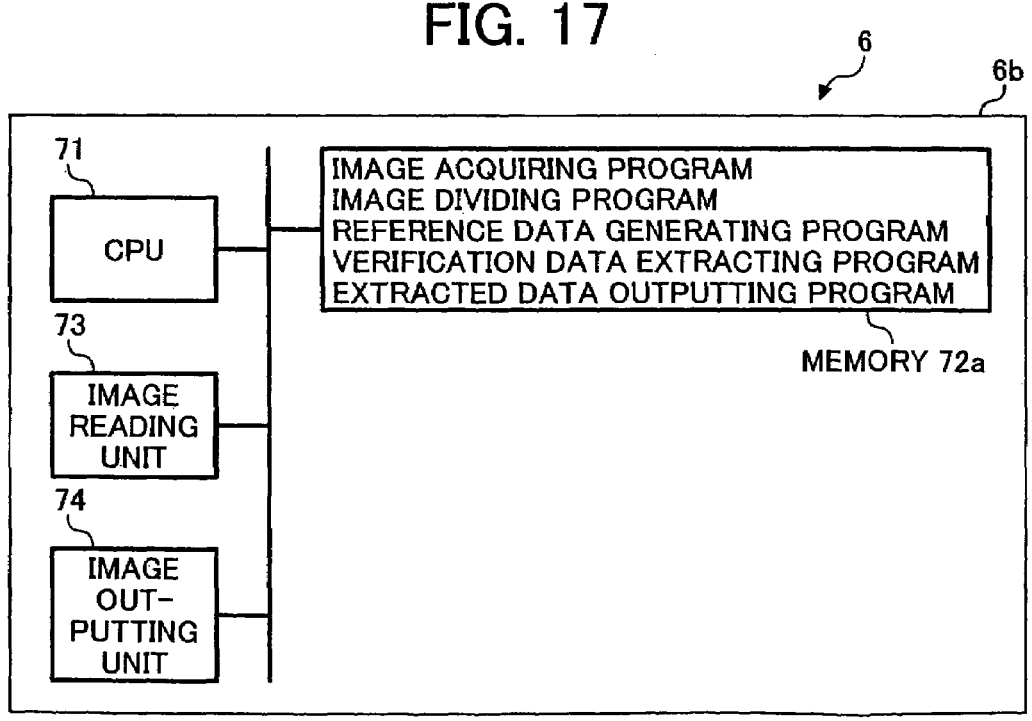
FIG. 17 is a structure of an image processing apparatus corresponding to the image processing apparatus shown in FIG. 16.

FIG. 17 shows a schematic structure 6b of the verification data extracting device 6 corresponding to the functional block diagram 6a of FIG. 16.

In the schematic structure 6b of the verification data extracting device 6, there are a central processing unit (or CPU) 71, a memory 72a, an image reading unit 73, and an image outputting unit 74.

The memory 72a of FIG. 17 generally includes a read only memory (or ROM) and a random access memory (or RAM). The memory 72a stores an encoded document image acquiring program, an encoded document image dividing program, a reference data generating program, a verification data extracting program, and an extracted data outputting program so that these programs can perform respective steps of verification data extracting according to the present invention.

Processes for extracting verification data by the verification data extracting device 6 are described below, referring to FIGS. 18 and 19.

FIG. 18 shows an encoded document image horizontally divided into two equal areas, and respective scanning directions. FIG. 19 shows the encoded document image vertically divided into two equal areas, and respective scanning directions.

The encoded document image acquiring unit 61 reads the printed material to acquire an encoded document image ED.

The encoded document image dividing unit 62 divides the encoded document image ED into a plurality of rectangle areas as shown in FIG. 18. That is, the encoded document image dividing unit 62 divides the encoded document image ED into two equal areas, such as upper and lower areas 51 and 52, by a parting line 53 horizontally extending across the center point C of the encoded docu-ment image ED, as shown in FIG. 18. That is, the encoded document image ED is laterally divided into two equal areas.

In this embodiment, the encoded document image ED is horizontally divided into two equal areas. However, an encoded document image may be divided into a plurality of equal areas other than two equal areas.

The verification data extracting unit 63 extracts the verification data as tampering detection data from each of the upper and lower areas 51 and 52. That is, while the raster scanning is performed from the upper left side to the lower right side on the upper area 51 of the encoded document image ED, the raster scanning is performed from the lower right side to the upper left side on the lower area 52 of the encoded document image ED, so that codes "0" and "1" embedded to both areas 51 and 52 can be extracted from the encoded document image ED.

With the above-described operations, even when the encoded document image ED is orientated in an opposite direction from which the original document image OD is originally scanned, embedded verification data can surely be extracted. That is, even when the encoded document image is placed in a different orientation from the original document image OD, the scanning directions of the encoded document image ED may be same as the original document image OD, so the embedded data can surely be extracted.

Therefore, embedded data of the printed material in a different orientation with respect to the original document image OD can correctly be extracted.

Regarding tampering detection of a printed material, detection data or a resultant hash value of each area of the above-described areas may be calculated to compare with the original hash value. If the resultant hash value matches the original hash value, no tampering data is detected. If the resultant hash value is different from the original hash value, the verification document image is determined to be including tampering data. The extracted data outputting unit 64 outputs the extraction results on an outputting medium such as a display screen.

As previously described, the original document image OD can be divided vertically, as shown in FIG. 19.

The processes for extracting verification data corresponding to the encoded document image ED of FIG. 19 are basically same as the above-described processes corresponding to the encoded document image ED of FIG. 18, except a parting line 53' extends vertically for dividing the encoded document image ED into right and left areas 51' and 52' so that the original document image OD can be scanned as shown in FIG. 19. Therefore, the detail of the processes for the encoded document image ED of FIG. 18 may be omitted.

With the verification data extracting device according to the present invention, when an image of a printed material is scanned by an image reading unit such as a scanner with the image of the printed material being inverted or reversed, the verification data extracting device of the present invention can extract verification data from the printed material because the image of the printed material has no change in appearance of verification patterns and in scanning direction for extracting the verification data without determining its scanning direction.

Referring to FIGS. 20 through 23, a verification data extracting device 7 alternative to the verification data extracting device 6 according to another embodiment of the present invention is described. This embodiment shows a case in which tampered information is included in a printed material.

FIG. 20 illustrates a functional block diagram 7a of the verification data extracting device 7 that serves as an image processing apparatus performing tampering detection.

The verification data extracting device 7 is basically same the as the verification data extracting unit 6, except that the verification data extracting device 6 further includes a verification pattern determining units 65.

The verification pattern determining unit 65 determines verification patterns to be extracted from the encoded document image ED.

Figure 21:
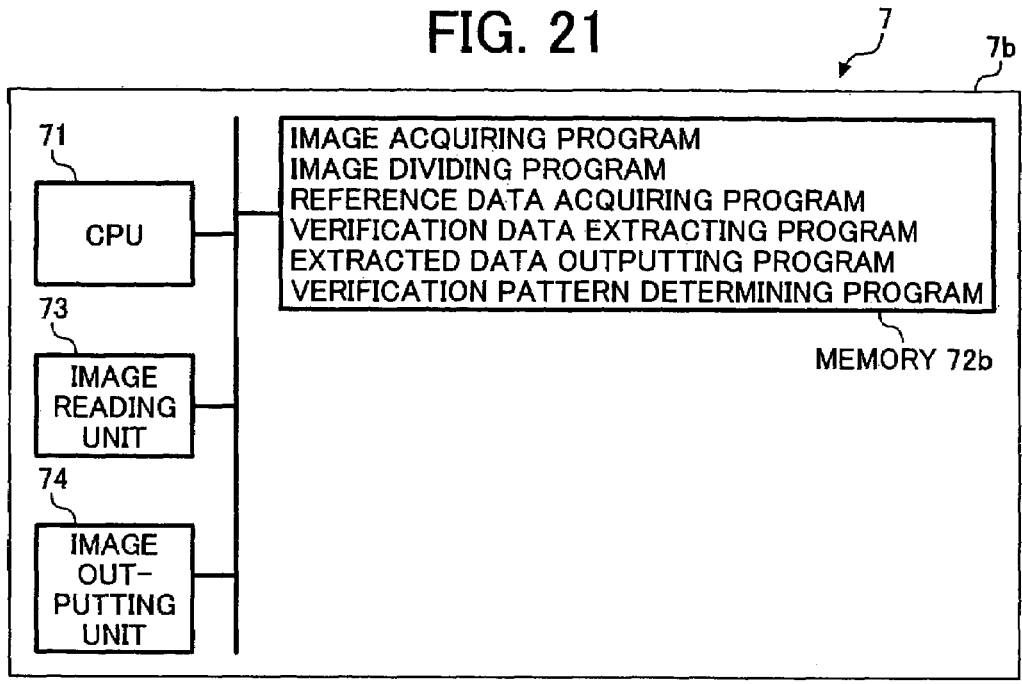
FIG. 21 is a structure of an image processing apparatus corresponding to the image processing apparatus shown in FIG. 20.

FIG. 21 shows a schematic structure 7b of the verification data extracting device 7 corresponding to the functional block diagram 7a of FIG. 20.

The verification data extracting device 7b of the verification data extracting device 7 is basically the same as the schematic structure 6b of the verification data extracting device 7 of FIG. 17, except that a verification pattern determining program is stored in a memory 72b. The verification pattern determining program may be run on the verification pattern determining unit 65.

The encoded document image acquiring unit 61 scans the printed material as a target image to acquire the encoded document image ED.

Figure 22:
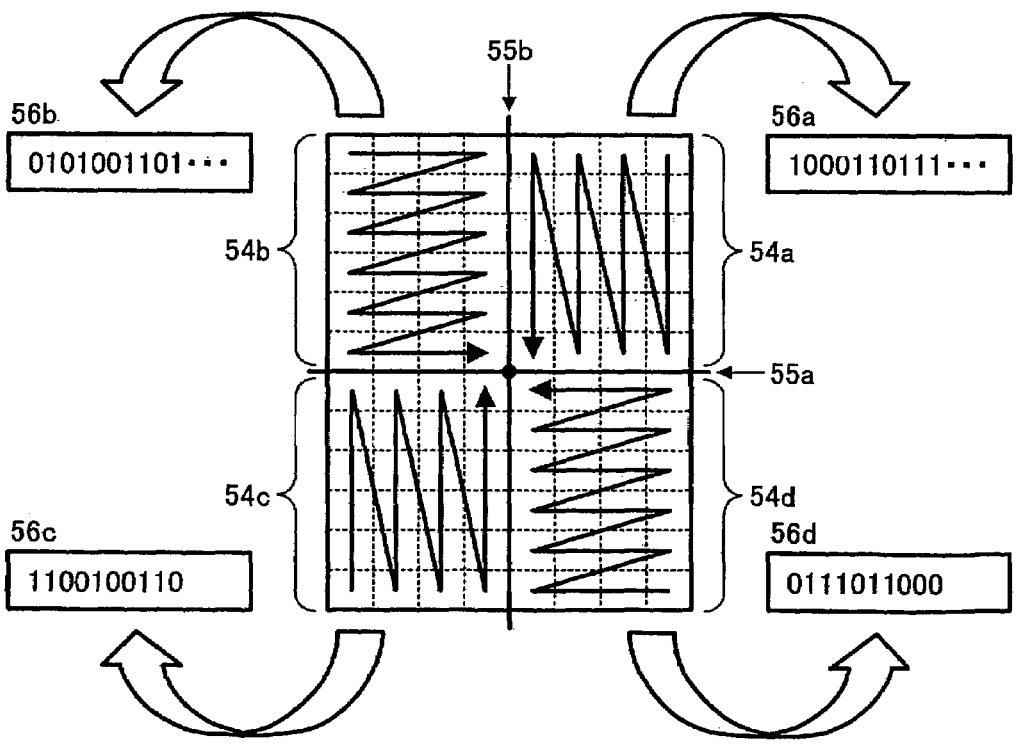
FIG. 22 is an exemplary encoded document image divided into four areas, and exemplary scanning directions thereof for extracting verification data to respective areas.
Figure 24:
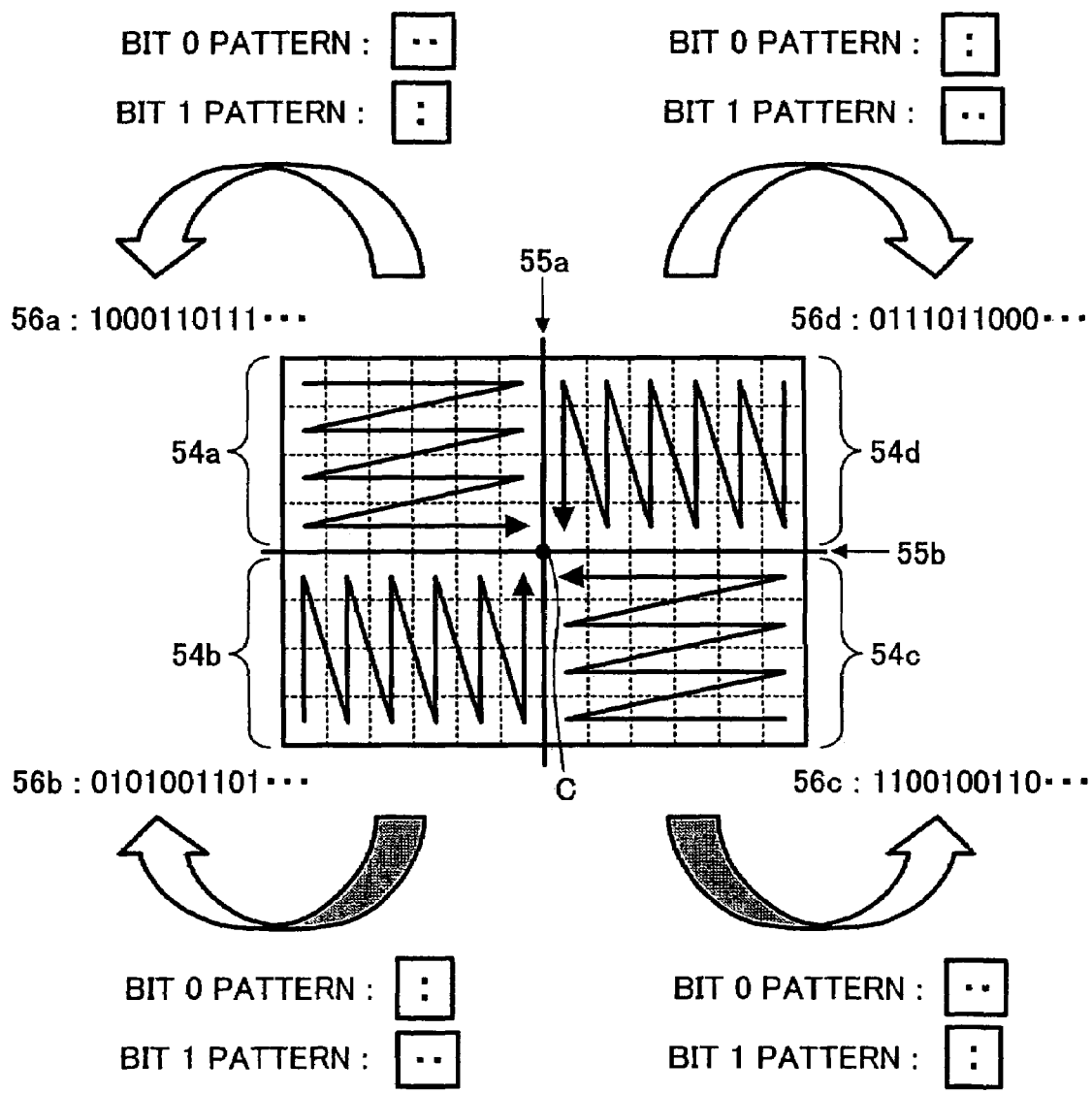
FIG. 24 shows exemplary scanning directions for extracting verification data from the exemplary encoded document image shown in FIG. 23.

FIGS. 22 through 24 show how the verification data is extracted.

In this embodiment, the encoded document image dividing unit 62 divides the encoded document image into four equal areas. More specifically, as shown in FIG. 22, the encoded document image dividing unit 62 divides the encoded document image ED into four equal areas, which is the same manner that the original document image dividing unit 12 divides the original document image OD as shown in (I) of FIG. 13A. More specifically, the encoded document image ED is divided into upper right, upper left, lower left, and lower right areas 54*a*, 54*b*, 54*c*, and 54*d* by parting lines (or horizontal and vertical lines) 55*a* and 55*b* horizontally and vertically extending across a center point C of the encoded document image ED. That is, the encoded document image ED is laterally and longitudinally divided into the four equal areas 54*a*, 54*b*, 54*c*, and 54*d*.

In this example, the encoded document image ED of FIG. 22 is divided into four equal areas. However, an encoded document image may be divided into a plurality of equal areas other than four equal areas.

The verification data extracting unit 63 performs raster scanning over each of the areas 54*a*, 54*b*, 54*c*, and 54*d* to extract embedded codes "0" and "1" of first, second, third, and fourth verification data 56*a*, 56*b*, 56*c*, and 56*d*, respectively. More specifically, the verification data extracting unit 63 performs raster scanning as follows. The upper right area 54*a* of the encoded document image ED is read from the upper right side to the lower left side to extract the first verification data 56*a*. The upper left area 54*b* of the encoded document image ED is read from the upper left side to the lower right side to extract the second verification data 56*b*. The lower left area 54*c* of the encoded document image ED is read from the lower left side to the upper right side to extract the third verification data 56*c*. The lower right area 54*d* of the encoded document image ED is read from the lower right side to the upper left side to extract the fourth verification data 56*d*.

FIG. 22 also shows respective scanning directions of verification data extracting when verification data is extracted from the upper right, upper left, lower left, and lower right areas 54*a*, 54*b*, 54*c*, and 54*d*, respectively.

In FIG. 23, the encoded document image ED is placed such that the encoded document image ED has a different orientation from the encoded document image ED of FIG. 22 and from the original document image OD originally scanned.

In FIG. 24, processes for extracting verification data corresponding to the encoded document image ED of FIG. 23 are described. The processes shown for extracting verification data of the encoded document image ED of FIG. 23 are basically the same as the above-described processes corresponding to the encoded document image ED of FIG. 22, expect that the encoded document image ED of FIG. 23 is rotated by 90 degrees to the left. Therefore, the detail of the processes of the encoded document image ED of FIG. 23 may be omitted. However, it is to be noted that the raster scanning for the encoded document image ED of FIG. 23 is performed in the same scanning direction as the encoded document image ED of the FIG. 22.

With the above-described operations of raster scanning, even when the encoded document image ED is placed orientating in a different directions from which the original document image OD is originally scanned. That is, even when the encoded document image ED is placed in a different orientation from the original document image OD, the scanning directions of the respective areas of the encoded document image ED may be same as those of the original document image OD, so the embedded data can surely be extracted.

Therefore, even when the printed material or the encoded document image ED is placed with its direction differently or reversely oriented with respect to the original document image OD, the embedded verification data of the encoded document image can surely be extracted without determining whether the encoded document image ED is scanned from the same side or the different side of the original document image OD. More specifically, as shown in FIG. 23, when the encoded document image ED is rotated 90 degrees to the left with respect to the original document image OD, the embedded verification data of the encoded document image ED can surely be extracted.

Regarding tampering detection of a printed material, detection data or a resultant hash value of each area of the above-described areas may be calculated to compare with the original hash value. If the resultant hash value matches the original hash value, no tampering data is detected. If the resultant hash value is different from the original hash value, the encoded document image ED is determined to be including tampering data. The extracted data outputting unit 64 outputs the extraction results on an outputting medium such as a display screen.

With the verification data extracting device of the present invention, when an image of a printed material is scanned with the image of the printed material being inverted or reversed, the verification data extracting device of the present invention can extract verification data from the printed material because the image of the printed material has no change in appearance of verification patterns and in scanning direction for extracting the verification data without determining its scanning direction.

According to the present invention, when an image or a printed material is placed with its direction differently or reversely oriented, the image or the printed material does not have to be rotated. That is, when the image or the printed material is rotated by 90, 180, 270 degrees, the device does not have to be judged to rotate. More specifically, the printed material is divided into a plurality of areas by a parting line across a center point of the printed material, so that the scanning direction may not change even when the printed material is placed with its direction differently or reversely oriented.

Further, verification patterns that can be rendered in a same manner even when the printed material is inverted or reversed are used. Using such verification patterns allows the verification data embedded to the printed material to be extracted even when the printed material is scanned in an orientation different from an original document image is originally scanned.

The above-described embodiments are illustrative, and numerous additional modifications and variations are possible in light of the above teachings. For example, elements and/or features of different illustrative and exemplary embodiments herein may be combined with each other and/or substituted for each other within the scope of this disclosure and appended claims. It is therefore to be understood that within the scope of the appended claims, the disclosure of this patent specification may be practiced otherwise than as specifically described herein.

What is claimed as new and desired to be secured by Letters Patent of the United States is:

1. An image processing apparatus, comprising:
    an acquiring mechanism configured to acquire an original document image;
    a dividing mechanism configured to divide the original document image acquired by the acquiring mechanism into a plurality of areas arranged in symmetry with respect to a center point of the original document image when the original document image is rotated centering around the center point of the original document image;
a generating mechanism configured to generate verification data corresponding to the plurality of respective areas divided by the dividing mechanism; and
an embedding mechanism configured to embed the verification data to the original document image in an identical scanning direction in a manner of point symmetry with respect to the center point of the original document image and to generate an encoded document image including the verification data.

2. The image processing apparatus according to claim 1, further comprising:
a verification pattern determining mechanism configured to determine a plurality of verification patterns of the verification data to be rendered to the plurality of respective areas.

3. The image processing apparatus according to claim 2, wherein the verification data is rendered with the plurality of verification patterns configured to form patterns corresponding to the encoded document image when the encoded document image is scanned in the identical scanning direction in a manner of point symmetry with respect to the center point of the original document image.

4. The image processing apparatus according to claim 1, further comprising:
a printing mechanism configured to print out the encoded document image.

5. The image processing apparatus according to claim 1, wherein the verification data includes tamper-proof data.

6. A method of image processing, comprising:
acquiring an original document image;
dividing the original document image into a plurality of areas arranged in symmetry with respect to a center point of the original document image when the original document image is rotated centering around the center point of the original document image;
generating verification data corresponding to the plurality of respective areas;
embedding the verification data in the original document image in an identical scanning direction in a manner of point symmetry with respect to the center point of the original document image; and
generating an encoded document image including the verification data.

7. The method according to claim 6, further comprising:
determining a plurality of verification patterns of the verification data to be rendered to the plurality of respective areas.

8. The method according to claim 7, wherein the verification data is rendered with the plurality of verification patterns configured to form patterns corresponding to the encoded document image when the encoded document image is scanned in the identical scanning direction in a manner of point symmetry with respect to the center point of the original document image.

9. The method according to claim 6, further comprising:
printing out the encoded document image.

10. The method according to claim 6, wherein the verification data includes tamper-proof data.

11. A computer program product stored on a computer readable storage medium for carrying out an image processing method, when running on an image processing apparatus, the image processing method comprising:
acquiring an original document image;
dividing the original document image into a plurality of areas arranged in symmetry with respect to a center point of the original document image when the original document image is rotated centering around the center point of the original document image;
generating verification data corresponding to the plurality of respective areas;
embedding the verification data in the original document image in an identical scanning direction in a manner of point symmetry with respect to the center point of the original document image; and
generating an encoded document image including the verification data.

12. The product according to claim 11, wherein the method further comprises:
determining a plurality of verification patterns of the verification data to be rendered to the plurality of respective areas.

13. The product according to claim 12, wherein the verification data is rendered with the plurality of verification patterns configured to form patterns corresponding to the encoded document image when the encoded document image is scanned in the identical scanning direction in a manner of point symmetry with respect to the center point of the original document image.

14. The product according to claim 11, wherein the method further comprises:
printing out the encoded document image.

15. The product according to claim 11, wherein the verification data includes tamper-proof data.

16. A computer readable recoding medium storing computer instructions for performing an image processing method, the method comprising:
acquiring an original document image;
dividing the original document image into a plurality of areas arranged in symmetry with respect to a center point of the original document image when the original document image is rotated centering around the center point of the original document image;
generating verification data corresponding to the plurality of respective areas;
embedding the verification data in the original document image in an identical scanning direction in a manner of point symmetry with respect to the center point of the original document image; and
generating an encoded document image including the verification data.

17. The storage medium according to claim 16, wherein the method further comprising:
determining a plurality of verification patterns of the verification data to be rendered to the plurality of respective areas.

18. The storage medium according to claim 17, wherein the verification data is rendered with the plurality of verification patterns configured to form patterns corresponding to the encoded document image when the encoded document image is scanned in the identical scanning direction in a manner of point symmetry with respect to the center point of the original document image.

19. The storage medium according to claim 16, wherein the method further comprising:
printing out the encoded document image.

20. The storage medium according to claim 16, wherein the verification data includes tamper-proof data.

21. An image processing apparatus, comprising:
an acquiring mechanism configured to acquire an encoded document image;

a dividing mechanism configured to divide the encoded document image acquired by the acquiring mechanism into a plurality of areas arranged in symmetry with respect to a center point of the encoded document image when the original document image is rotated centering around the center point of the original document image; and an extracting mechanism configured to extract verification data from the encoded document image in an identical scanning direction in a manner of point symmetry with respect to the center point of the encoded document image.

22. The image processing apparatus according to claim 21, further comprising:

a verification pattern determining mechanism configured to determine a plurality of verification patterns of the verification data to be rendered to the plurality of respective areas.

23. The image processing apparatus according to claim 21, wherein the acquiring mechanism acquires the encoded document image as a printed material.

24. The image processing apparatus according to claim 21, further comprising:

an outputting mechanism configured to output at least one of extracted verification data extracted by the verification data extracting mechanism and an extraction result extracted by the verification data extracting mechanism.

25. The image processing apparatus according to claim 21, wherein the verification data includes tamper-proof data.

26. A method of image processing, comprising:

acquiring an encoded document image;

dividing the encoded document image into a plurality of areas arranged in symmetry with respect to a center point of the encoded document image when the original document image is rotated centering around the center point of the original document image; and extracting verification data from the encoded document image in an identical scanning direction in a manner of point symmetry with respect to the center point of the encoded document image.

27. The method according to claim 26, further comprising:

determining a plurality of verification patterns of the verification data to be rendered to the plurality of respective areas.

28. The method according to claim 26, wherein the acquiring acquires the encoded document image as a printed material.

29. The method according to claim 26, further comprising:

outputting at least one of extracted verification data and an extraction result extracted by the extracting.

30. The method according to claim 26, wherein the verification data includes tamper-proof data.

31. A computer program product stored on a computer readable storage medium for carrying out an image processing method, when running on an image processing apparatus, the image processing method comprising:

acquiring an encoded document image;

dividing the encoded document image into a plurality of areas arranged in symmetry with respect to a center point of the encoded document image when the original document image is rotated centering around the center point of the original document image; and extracting verification data from the encoded document image in an identical scanning direction in a manner of point symmetry with respect to the center point of the encoded document image.

32. The product according to claim 31, wherein the method further comprises:

determining a plurality of verification patterns of the verification data to be rendered to the plurality of respective areas.

33. The product according to claim 31, wherein the acquiring acquires the encoded document image as a printed material.

34. The product according to claim 31, wherein the method further comprises:

outputting at least one of extracted verification data and an extraction result extracted by the extracting.

35. The product according to claim 31, wherein the verification data includes tamper-proof data.

36. A computer readable recoding medium storing computer instructions for performing an image processing method, the method comprising:

acquiring an encoded document image;

dividing the encoded document image into a plurality of areas arranged in symmetry with respect to a center point of the encoded document image when the original document image is rotated centering around the center point of the original document image; and extracting verification data from the encoded document image in an identical scanning direction in a manner of point symmetry with respect to the center point of the encoded document image.

37. The storage medium according to claim 36, wherein the method further comprises:

determining a plurality of verification patterns of the verification data to be rendered to the plurality of respective areas.

38. The storage medium according to claim 36, wherein the acquiring acquires the encoded document image as a printed material.

39. The storage medium according to claim 36, wherein the method further comprises:

outputting at least one of extracted verification data and an extraction result extracted by the extracting.

40. The storage medium according to claim 36, wherein the verification data includes tamper-proof data.

* * * * *